April 20, 1954

J. R. BUCK 2,675,702

SYSTEM FOR MEASURING RATE AND DIRECTION
OF FLOW IN A PASSAGE

Filed March 6, 1950

JULIAN R. BUCK
INVENTOR.

BY D. Carl Richards
ATTORNEY

April 20, 1954
J. R. BUCK
2,675,702
SYSTEM FOR MEASURING RATE AND DIRECTION
OF FLOW IN A PASSAGE
Filed March 6, 1950
4 Sheets-Sheet 2
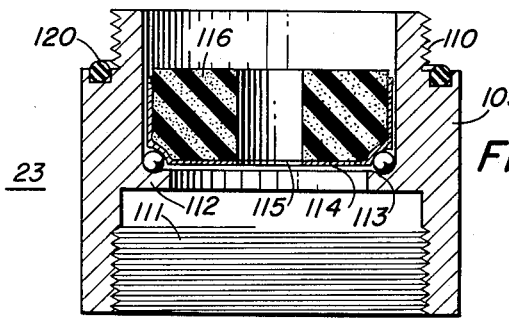
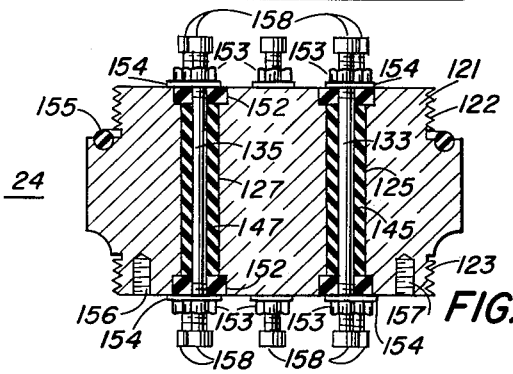
JULIAN R. BUCK
INVENTOR.
BY *D. Carl Richards*
ATTORNEY JULIAN R. BUCK
INVENTOR.
BY D. Carl Richards
ATTORNEY

JULIAN R. BUCK
INVENTOR.

Patented Apr. 20, 1954

2,675,702

UNITED STATES PATENT OFFICE 2,675,702

SYSTEM FOR MEASURING RATE AND DIRECTION OF FLOW IN A PASSAGE

Julian R. Buck, Dallas, Tex., assignor, by mesne assignments, to Socony-Vacuum Oil Company, Incorporated, New York, N. Y., a corporation of New York Application March 6, 1950, Serial No. 147,971

10 Claims. (Cl. 73—155)

This invention relates to measurement of fluid flow and relates more particularly to an instrument for surveying well bores and the like to determine the rate and direction of flow of fluids therein.

Well bores, such as oil, water, and gas well bores, may penetrate several horizons or strata at different levels and a number of these horizons or strata may be simultaneously producing fluids to the well bore. Further, the well bore may penetrate a porous horizon into which a well fluid produced from another horizon will enter from the well bore with resultant loss of the otherwise recoverable fluid. It is highly important in order to obtain efficient well operation, particularly with respect to oil well operation, to know the rate and direction of the fluid flow at any and every point in the well bore since from such knowledge, the location of producing horizons and the location of horizons into which desired well fluids are flowing with resultant loss can be determined and the proper remedial measures taken. Additionally, it is often highly desirable to know the rate at which various horizons are producing fluid to the well bore in order that steps may be taken to obtain most efficient utilization of reservoir energy. Further, in pressure maintenance operations or secondary recovery operations where fluid is injected into a well, it is important to know which horizons are receiving the fluid and the rate at which they are receiving the fluid.

It is an object of this invention to provide an apparatus for measuring the rate and direction of fluid flow at any point in a passage. It is a more specific object of this invention to provide an apparatus for surveying an oil well bore hole to determine the rate and direction of flow at any point in the bore hole.

Heretofore, apparatus has been provided for determining the rate and direction of fluid flow in a well bore. Further, it is known that the rate of fluid flow in a passage, such as a conduit, may be measured by supplying a known amount of heat to the flowing fluid from an electrical heater and determining the increase in temperature of the flowing fluid by such means as an electrical resistance thermometer, the increase in temperature being a measure of the rate of fluid flow. If an instrument having a self-contained recorder is employed to measure the rate and direction of fluid flow, the desired information is not obtained until the instrument is removed from the well bore. On the other hand, if separate conductors leading from the heater and the electrical resistance thermometers to proper indicating or recording devices on the surface of the ground are employed in order that the desired information may be obtained immediately, a large number of conductors is required which increases the diameter of the cable or cables passing through the well head. Since the force of extrusion acting on a cable at the well head by the well pressure is proportional to the square of the diameter of the cable, the problem of leakage of oil and gas from the orifice in the well head through which the instrument cable or cables pass, with resultant danger of fire and loss of oil and gas, increases with increasing diameter of cable. Accordingly, it is essential that the number of conductors leading to the instrument be at a minimum in order to minimize the diameter of the cable assembly passing through the well head.

It is another object of this invention to provide a well fluid surveying apparatus requiring only two conductors within the cable assembly passing through the well head. It is another object of this invention to provide a well fluid surveying instrument requiring a cable of small diameter.

Further objects of the invention will become apparent from the following detailed description thereof read in conjunction with the drawings in which:

Figure 5 is an elevation in section of a lower support for apparatus to be held within the instrument case of Figure 1;

Figure 6 is an elevation in section of the lower pressure head of Figure 1;

Figure 7 is a top view of the lower pressure head of Figure 6;

Figure 11 is an elevation in section of a cable for supporting the exploring unit in a well bore and providing the conductors to the unit;

Figure 13 is a schematic diagram illustrating a method of employing the well fluid surveying instrument.

Figure 1:
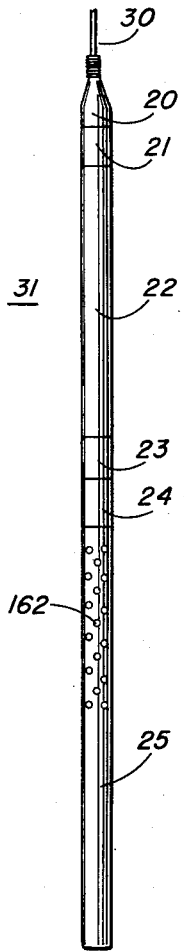
Figure 1 is an elevation of the exploring unit of the instrument of the invention.

Referring now to Figure 1, the exploring unit of the well fluid surveying instrument comprises a socket assembly 20, an upper pressure head 21, an instrument case 22, a lower support 23, a lower pressure head 24, and a sensitive element housing 25. A cable 30 enters the upper portion of the socket assembly and serves to suspend the unit and to provide the conductors thereto. The exploring unit of the well fluid surveying instrument, indicated generally by the numeral 31, may be of any suitable dimensions. However, since the instrument finds particular use in oil well bore holes, the exploring unit must be of sufficiently small cross sectional area to be suspended within the bore holes, or within the casing or tubing of the bore hole, and to interfere with the flow of fluid to the minimum practical extent. In this connection, it will be realized, of course, that any unit suspended in the bore hole will interfere with the flow of the fluid to a greater or lesser extent, and complete elimination of interference with the flow of fluid cannot be effected. The unit should also be of such length that it may negotiate any changes in the direction of the well ordinarily encountered.

Figure 2:
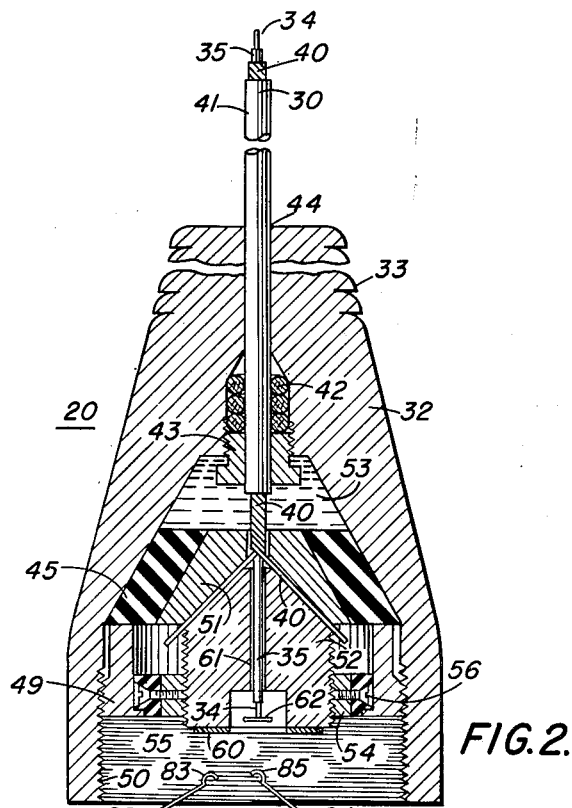
Figure 2 is an elevation in section of the socket assembly of Figure 1.

Referring now to Figure 2, the socket assembly 20 has an outer housing 32. The upper portion of the housing is shaped to provide an anchor 33 to which a fishing tool may readily attach in the event the exploring unit must be fished from the well. If desired, other suitable types of anchors may be employed in conjunction with the socket assembly. The cable 30 enters the socket assembly through the anchor 33 and the socket assembly provides the means for gripping the cable.

In accordance with one feature of the invention, the present instrument requires only two conductors leading to the exploring unit from the surface. However, ordinary electrical conductors, such as copper conductors, have comparatively low tensile strengths and are not suitable for suspending the exploring unit within the well bore. In the instrument of the invention, there is employed a co-axial suspending cable comprising a steel braid, which provides the required tensile strength to suspend the exploring unit and is used as one of the conductors, and a copper wire, which is used as the second conductor, positioned within and insulated from the steel braid. As shown in Figure 11, the cable has an inner copper conductor 34 surrounded by a layer of insulation 35, which in turn is surrounded by a steel braid 40, and the entire assembly is covered by an outer layer of insulation 41.

Referring again to Figure 2, a spiral packing 42 is held tightly around cable 30 by gland nut 43 to minimize migration of well fluids into the socket assembly through the cable entry port 44. The layer of insulation 41 of cable 30 is extended below the gland nut 43 in order to prevent electrical contact of the steel braid 40 with the outer housing 32. An insulating cone 45 is brought to bear against the inner surface of the housing 32 by means of threaded retainer ring 49 cooperating with threads 50 of the housing 32, and a gripping cone 51 is positioned internally with respect to the cone 45. The steel braid 40 is flared outwardly at its lower end and is gripped tightly between the internal surface of cone 51 and the exernal surface of a gripping wedge 52 to provide the suspending attachment between the cable and the exploring unit. The wedge 52 is electrically conducting and when contacting the steel braid provides an electrical connection therewith. Oil or other electrical insulating liquid is placed in the space 53 between the cones 45 and 51 and the gland nut 43 in order to further prevent migration of well fluids through the cable entry port 44 with possible electrical contact of wedge 51 with the outer casing 32. Leakage of the insulating liquid downwardly along the walls of the layer of insulation 35 is permissible but will be prevented when the upper pressure head 21 is screwed into the socket assembly thereby providing a pressure seal. The wedge 52 is threaded externally so that it may be screwed in cooperation with threaded ring 54 against gripping cone 51, and an electrical insulating ring 55 to insulate the gripping cone from the outer housing 32 is interposed between retainer ring 49 and threaded ring 54, and rings 54 and 55 are held together by means of a plurality of countersunk screws 56. An electrically conducting contact ring 60 is affixed to the bottom portion of the gripping wedge 52. The layer of insulation 35 and the conductor 34 extend through port 61 in gripping wedge 52, and conductor 34 terminates in contact point 62.

Figure 3:
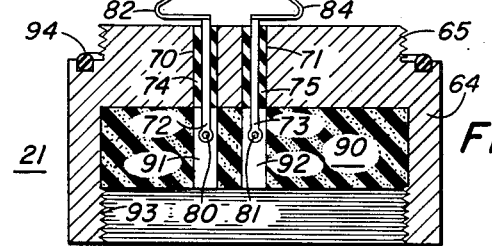
Figure 3 is an elevation in section of the upper pressure head of Figure 1.

Referring now to Figure 3, the upper pressure head 21 comprises a body member 64 having threads 65 adapted to cooperate with threads 50 of housing 32 so that the body portion may be screwed into socket assembly 20. Two ports 70 and 71 are provided in the body portion and electrical conductors 72 and 73, respectively, pass through the ports, being insulated from the body member by insulators 74 and 75, respectively, which also form a pressure seal between the conductors and the body members. Conductor 72 is provided with eye terminal 80 and conductor 73 is provided with eye terminal 81. A spring 82 terminating in contactor 83 is electrically connected to the other end of conductor 72 and a similar spring 84 terminating in contactor 85 is electrically connected to conductor 73. A cushion 90 made of a material such as sponge rubber or the like and having ports 91 and 92 is positioned within the body member 64 interiorly of threads 93. The pressure head, upon assembly of the instrument, is screwed into the lower portion of the socket assembly, gasket ring 94 being provided to insure a liquid-tight connection, and contactor 85 will be positioned against contact point 62 and contactor 83 will be positioned against contact ring 60.

Figure 4:
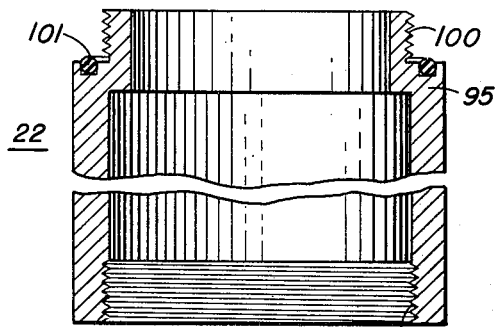
Figure 4 is an elevation in section of the instrument case of Figure 1.

Referring to Figure 4, instrument case 22 comprises a casing 95 having threads 100 adapted to cooperate with threads 93 of the upper pressure head 21 so that the casing may be screwed into the upper pressure head, gasket 101 being provided to insure a liquid-tight connection. Threads 102 are provided at the lower portion of the casing.

Lower support 23, referring to Figure 5, serves to support the instrument assembly, hereinafter more fully described, within the instrument case 22. The lower support comprises a casing 103 having threads 110 and 111 and a bearing support section 112, and a plurality of ball bearings 113 are interposed between the bearing support section and cup 114. The cup 114, which has a central port 115, holds a cushion 116 made of sponge rubber or the like and the instrument assembly is supported between this cushion and the cushion 90 of the upper pressure head 21. The lower support screws into the lower portion of the instrument case, gasket 120 being provided to assure a liquid-tight seal, and the cup 114 turns upon the bearings 113 to prevent twisting of the instrument assembly.

The lower pressure head 24, referring to Figures 6 and 7, comprises a body member 121 having threads 122 and 123. The body member is provided with ports 125, 126, 127, 128, 129 and 130 into which are tightly fitted electrical conductors 133, 134, 135, 136, 137 and 138, respectively, surrounded by insulators 145, 146, 147, 148, 149 and 150, respectively. To assure that the lower pressure head is liquid-tight, the ports are countersunk at their upper and lower ends and gaskets 152 are positioned therein. The conductors are threaded at each end to receive bolts 153 which, when tightened against slip rings 154, compress the gasket against the conductors and the insulators. The pressure head 24 screws into the lower support 23, threads 122 being received by threads 111, and gasket 155 is provided to prevent leakage of liquid between the pressure head and the lower support. With the upper and lower pressure heads positioned therein, the instrument case 22 is insulated from the pressure of the surrounding fluids. Bolt holes 156 and 157 are provided in the lower portion of the body member, and electrical contact posts 158 are screwed on both ends of each of the electrical conductors 132 and 139.

Figures 8, 9, 10:
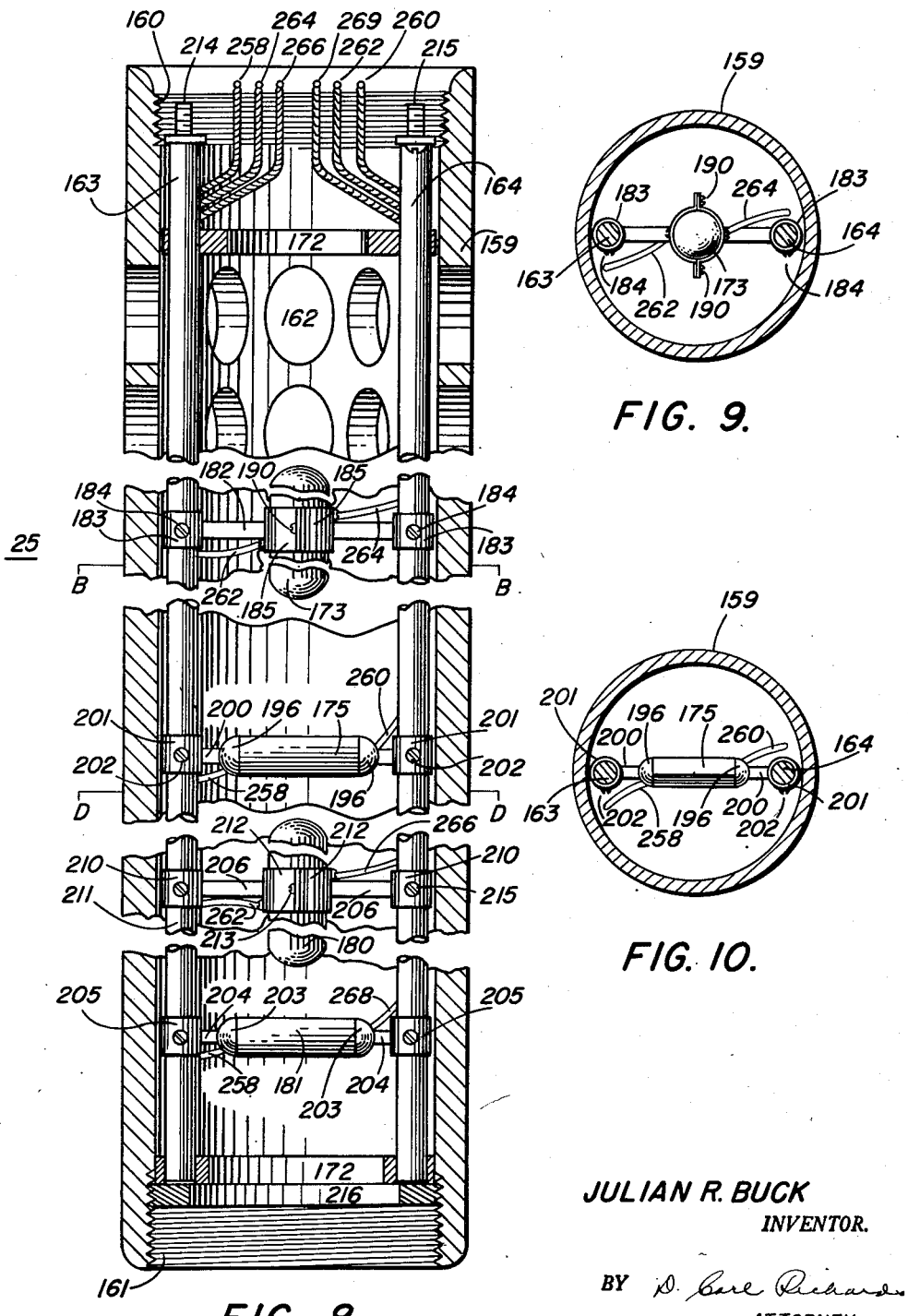
Figure 8 is an elevation in section of the sensitive element housing of Figure 1 and sensitive elements.
Figure 9 is a horizontal section taken along the line B—B of Figure 8.
Figure 10 is a horizontal section taken along the line D—D of Figure 8.

The sensitive element housing 25, Figure 8, comprises a casing 159 having threads 160 and 161 and, at the upper end, a plurality of fluid ports 162. The casing fits over rods 163 and 164, and the rods are fitted tightly into a plurality of retainer rings 172 which maintain the rods properly spaced with respect to each other. Rods 163 and 164 support, in fixed, spaced relationship, an electric dummy load heater 173, a temperature sensitive electric resistor 175, an electric heater 180, and another temperature sensitive electric resistor 181. Dummy load heater 173 is supported between the rods 163 and 164 by a pair of arms 182 terminating at one end in sleeves 183 through which the rods pass, screws 184 holding the sleeves to the rods, and terminating at the other end in face plates 185 for holding the heater, the plates being provided with bolts 190. The heater is electrically insulated from the rods 163 and 164, and this is accomplished by making the arms, sleeves, or face plates of electrically insulating material. The dummy load heater is positioned at the upper end of the rods as far as is practical from resistors 175 and 181 in order that the difference in the amount of heat radiated and conducted from this heater upon the two resistors will be negligible with respect to the temperature differential otherwise effected between the two resistors. The temperature sensitive electric resistor 175 is fitted into cups 196 attached to arms 200 terminating in sleeves 201 provided with screws 202, the resistor 175 being electrically insulated from the rods by making the cups, arms, or sleeves of electrically insulating material. The temperature sensitive electric resistor 181 is similarly supported between the rods by cups 203 attached to arms 204 terminating in sleeves 205 and is insulated electrically from the rods. Electric heater 180 is supported between rods 163 and 164 in the same manner as the dummy load heater 173 by means of arms 206 terminating in sleeves 210 provided with screws 211 and in face plates 212 provided with bolts 213. Preferably, the temperature sensitive electric resistors 175 and 181 are located equidistant from electric heater 180.

In assembling the exploring unit, the heaters and the temperature sensitive resistors are assembled on the rods 163 and 164, the spacer rings 172 being properly positioned, and the rods bolted by means of bolts 214 and 215 to the lower pressure head 24. In order to prevent short circuiting or cross connecting of the heaters, temperature sensitive resistors, and the conductors leading thereto by electrically conducting fluids, these elements are electrically insulated from each other and insulation is assured by coating the elements and connecting leads as by dipping or painting, with a chemically inert, electrically resistant, thermally conductive material, such as a silicone resin. The casing 159 is slipped over the rod assembly and screwed onto the lower pressure head and a retainer ring 216 is then screwed into the lower portion of the casing against the lower spacer ring.

With the well fluid surveying instrument assembled and the exploring unit positioned at a point in a well bore, upward flow of fluid in the well bore will result in fluid passing upwardly within the casing 159 and out through openings 162, passing over heater 180 and temperature sensitive resistors 175 and 181. When heater 180 is operating, the upward flow of fluid will result in an increase in temperature of resistor 175 over the resistor 181. With a downward flow of fluid in the well bore, the fluid will enter openings 162 and flow downwardly within the casing 159 and with heater 180 operating, the flow of fluid will result in an increase in temperature of resistor 181 over resistor 175. In each case, the increase in temperature of one resistor over the other will be a function of the rate of flow of the fluid and of the specific heat of the fluid, and by measurement of this temperature differential with knowledge of which resistor is at the higher temperature, the rate and direction of fluid flow can be determined. By means of the electrical system, hereinafter described, these measurements are made at the surface of the ground, or other location isolated from the exploring unit, with only two conductors leading to the exploring unit.

Figure 12:
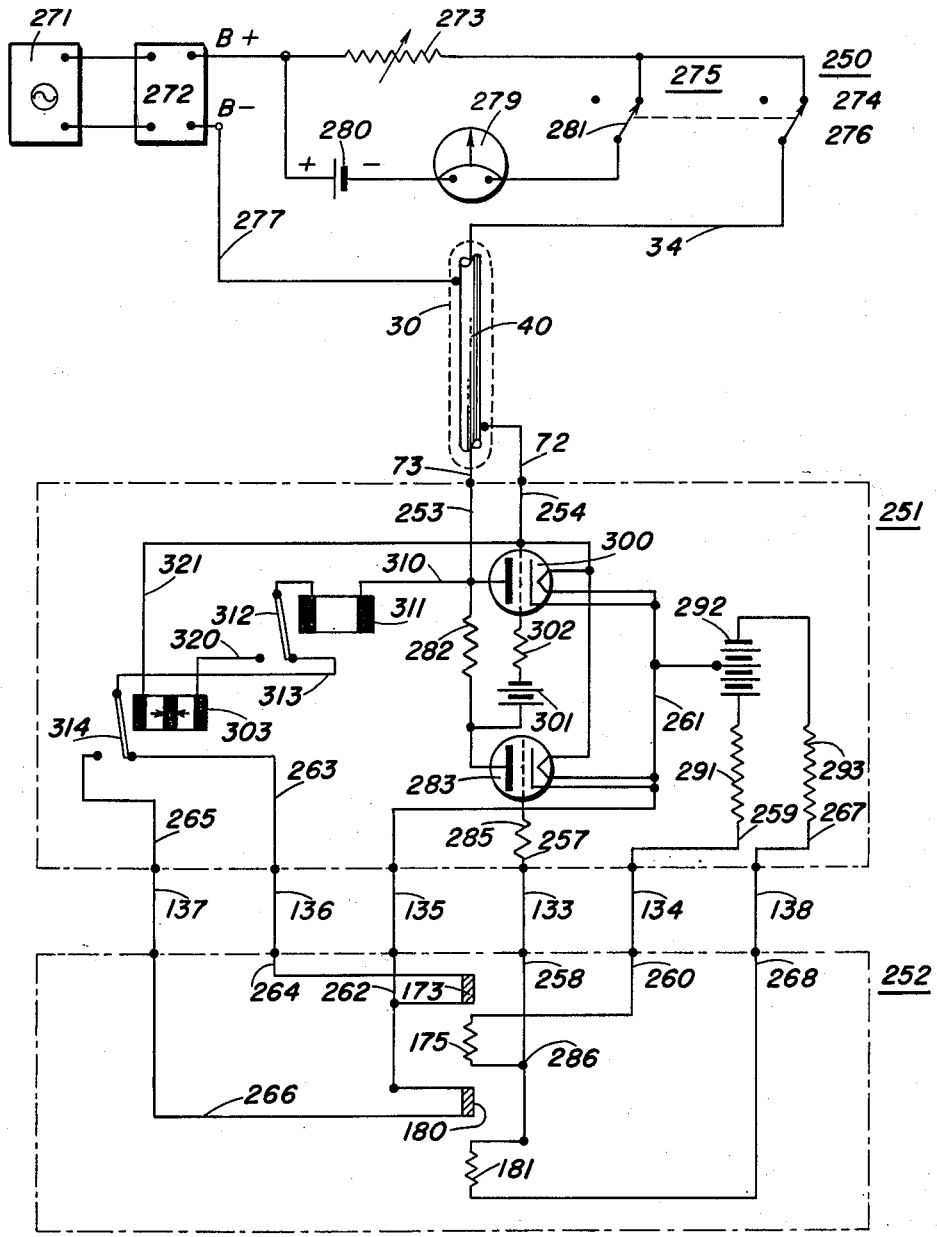
Figure 12 is a diagram of the electrical circuit of the well fluid surveying instrument.

The electrical system for the well fluid surveying instrument, illustrated schematically in Figure 12, comprises three units: namely, a power and measuring unit 250 located at the surface of the ground, an amplifier unit 251 which is positioned within the instrument case 22, and a sensitive element unit 252 which is positioned within the sensitive element housing 25 and includes the heaters 173 and 180, the temperature sensitive electric resistors 175 and 181, and the connecting leads. The unit 250 includes a source of power and measuring or indicating devices to be hereinafter described. The amplifier unit 251 is coupled to the power and measuring unit 250 by way of the two-conductor cable 30 and the conductors 72 and 73 in the upper pressure head 21, the conductors 72 and 73 being connected respectively to conductors 253 and 254. The sensitive element unit 252 is coupled to the amplifier unit 251 by way of the conductors 133, 134, 135, 136, 137 and 138 in the lower pressure head 24, these conductors being connected respectively to conductors 257 and 258, 259 and 260, 261 and 262, 263 and 264, 265 and 266, and 267 and 268.

In order better to understand the present invention, the circuits of the three units will first be described in detail and a description of their operation will then be given.

The power and measuring unit 250, located at the surface of the ground, may include a source of alternating current 271 which may conveniently be an engine driven 60-cycle generator. The source of current 271 is connected to a regulated rectifier or power supply 272 which provides, from the B+ and B— terminals, the plate and filament current for tubes of the amplifier unit 251 and heater current for the sensistive element unit 252. More particularly, the B+ terminal of the rectifier is connected through a variable resistor 273 to the terminal 274 of a double-pole, double-throw switch 275. As illustrated, the armature 276 of the switch 275, when in the right hand position, connects the B+ terminal of the supply 272 to the central conductor 34 of the cable 30. The negative side, or B— terminal, of the power supply 272 is connected by way of conductor 277 to the steel braid 40 forming the other conductor of the cable 30. A meter 279 and a battery 280 are connected in series and the series circuit is connected between the B+ terminal of the power supply 272 and contact arm 281 of the switch 275. Thus, the meter and battery are switched in circuit with and parallel to the resistors 273 when the switch armature 276 is connected to terminal 274. The meter 279 is then used to measure to a high degree of accuracy variations in the current flowing through resistor 273.

The variations in the current flowing through resistor 273 are the results of flow of fluids in the sensitive element housing 25 containing the sensitive element unit 252. When suitably calibrated, readings of the meter 279 may be converted into units of rate of flow of well fluids.

The direct current flowing in the cable 30 is the sum of two current components. One component is the current required for operation of the amplifier unit 251. The other component is the current required to operate or energize the sensitive element unit 252. Since the units 251 and 252 operate as a single unit electrically and are merely spaced apart physically, they will be, for the sake of convenience, described as a single circuit. The conductor 34 leading to the exploring unit is connected by way of conductor 253 through a resistor 282 to the anode of an amplifier triode 283. The cathode of the triode 283 is connected to conductor 261 and is thence connected through the filament of the triode 283 to the conductor 254 which in turn is connected through conductor 72 to the steel braid 40 of the cable 30 and forms the return to the B— terminal of the power supply 272. Thus, plate current flows from the anode to the cathode of triode 283 and then back through the filament to the conductor 254 and thence to the surface.

The grid circuit of the amplifier triode 283 includes a series resistor 285 connected through conductors 257, 133 and 258 to a juncture 286 common to the two temperature sensitive resistors 175 and 181. The resistor 175 is then connected by way of conductors 260, 134 and 259 and resistor 291 to the positive terminal of a battery 292 whose center tap is connected to the cathode of triode 283 by way of conductor 261. The negative terminal of battery 292 is connected through resistor 293 and conductors 267, 138 and 268 to the second terminal of the resistor 181. Resistors 175 and 181 are selected so that upon flow of current therethrough from battery 292 the common juncture 286 will be at a potential negative with respect to the cathode of triode 283, which negative potential is the operating bias for the amplifier triode 283 and in magnitude is adjusted to fit the requirements of the particular amplifier tube being utilized. Thereafter, if the resistors 175 and 181 are in regions of different temperature, the potential on the grid of the triode 283 will be changed from the operating point in proportion to the change of resistance in the resistors 175 and 181. The resultant change in plate current flowing through the resistor 282 to the change in grid potential may of itself be used to indicate variations in the flow of fluid passing resistors 175 and 181. However, a more sensitive instrument obtains by adding to the amplifier unit 251 a direct coupled amplifier tube 300 whose cathode is connected to conductor 261 and whose plate is connected directly through conductors 253 and 73 to the conductor 34 of the cable 30. The grid of amplifier tube 300 is directly coupled from the plate of triode 283 through a bias battery 301 and a series grid resistor 302. Thus, changes in the plate current of triode 283 are amplified or augmented by correspondingly greater changes in the plate current of tube 300. The combined plate currents from tubes 283 and 300 are one of the two components of direct current flowing through the surface resistor 273 and are a variable component of the surface current which is proportional to fluid flow through the exploring unit.

The second component of direct current is maintained essentially constant and flows through either the dummy load heater 173 or the heater 180 depending upon the position of rachet or stepping relay 303. As hereinabove indicated, the dummy load heater 173 is located a considerable distance from the resistors 175 and 181 while the heater 180 is located between and preferably equidistant from them. Thus, when dummy load heater 173 is supplied with current to heat the surrounding fluid, the resistors 175 and 181 may be assumed to be in fluid of uniform temperature since they are remote from heater 173. When heater 180 is turned on, the resistors 175 and 181 may or may not be at the same temperature, depending upon the conditions of flow.

The heating circuit includes cable 30, conductor 310, relay 311, relay armature 312, conductor 313, and relay armature 314. When the dummy load heater 173 is in the heating circuit, current flows from the armature 314 through the conductors 263, 136 and 264 through the heater 173, and thence through the conductors 262, 135 and 261. From conductor 261, the current divides and flows through the filaments of both tubes 283 and 300 to the conductors 254 and 72 and thence to the steel braid conductor 40 of the cable 30. When the stepping relay 311 is actuated to connect the armature 314 of relay 303 to the left-hand relay contact, current flows through conductors 265, 137 and 266 and heater 180 to conductors 262, 135 and 261. Thus, it will be seen that when the switch 275 is in the right-hand position, current flows either through the dummy load heater 173 or the lower heater 180. The stepping relay 311 is spring biased so that armature 312 normally is in contact with the left-hand terminal thereof. The left-hand terminal is connected by way of conductor 320 to the stepping relay 303. The other terminal of relay 303 is connected through conductor 321 to the steel braid conductor 40 of the cable 30.

The manner in which the measuring system functions will now be described. With the switch 275 in the position illustrated, the tubes 283 and 300 will be conducting, the plate currents being determined by the operating bias. Additionally, when the voltage from the rectifier or direct current source 272 is applied to the cable 30, the relay 311 is energized, moving the armature 312 to the right-hand contact completing the circuit through conductor 313, armature 314, and conductors 263 and 136 to the dummy load heater 173. The measuring circuit at the surface is then calibrated by varying the resistor 273 until the voltage thereacross is exactly equal and opposite to the voltage of the battery 280. At that point, the meter 279 registers zero. The meter 279 preferably has its zero at the center of the scale, permitting it to deflect in either direction to correspond with reversal of current in the meter circuit. After the resistor 273 has been adjusted for a zero reading on the meter 279, switch 275 is moved to the left-hand position to release armature 312 moving it to the left-hand contact. Thereafter, the switch 275 is immediately actuated back to the right-hand position. At the instant the switch closes, the voltage from the rectifier or direct current source 272 is applied across a circuit which includes in series the relay 311, relay 303, and the conductor 321. By proper selection of the time constants of the relays 311 and 303, they may be actuated in such a manner that the initial surge of current through both relays will perform the function of drawing armature 314 to a new position and propelling armature 312 toward the right-hand contact. As armature 312 begins its excursion, the current circuit is opened but the inertia of the armature 312 is such as to permit a completion of the circuit through the right-hand contact for flow of heating current through the selected heater 173 or 180. Each time the switch 275 is actuated to the right, the rachet or stepping relay 303 alternately moves the armature 314 from one contact to the other. In either position, a closed circuit is maintained. Thus, after actuation of the switch 275, the armature 314 should be in contact with the left-hand terminal of the relay 303 which is connected through conductors 265, 137 and 266 to heater 180. Flow of current through heater 180 raises the temperature of the surrounding fluids. If the flow is upward through the sensitive element housing 25, the temperature of the fluid adjacent to the temperature sensitive resistor 175 is elevated, thus lowering the resistance thereof. This alters the potential at the common juncture 286 and thus changes the grid bias on the triode 283. For the action just described, the grid will go more positive, increasing the plate current in triode 283 which increase also causes a corresponding and amplified decrease in the anode current of tube 300. The plate resistance 282 preferably is very high so that the plate current will be relatively small. The change of voltage across relatively large resistor 282, applied through battery 301 and resistance 302, produces a relatively large change in the plate current of tube 300 which has as its load only the cable 30 and the resistance 273. The difference between the currents from tubes 283 and 300 is the variable measured. The total change in plate currents is then indicated by the deflection of the meter 279.

If the flow of fluid is downward through the sensitive element housing 25, the temperature sensitive resistor 181 will decrease in resistance because of the elevated temperature which will change the potential of point 286 to cause a decrease in the plate current of tube 283 with the corresponding and amplified increase in the plate current of tube 300. By suitably calibrating the system, minute changes in the total plate current will be a direct reading or indication of the rate of fluid flow through the sensitive element in the housing 25 and hence in the well bore.

In the system above described, the source of power 271 is positioned at the surface, since ordinarily it may not, because of its size, be lowered into the bore hole. Two current components from the source 271 traverse the two-conductor circuit extending into the bore hole. A first component is utilized to heat the well fluids. A second component is the anode-cathode current of the amplifier positioned in the hole. By the present invention the aforementioned currents are combined and traverse a series path. Preferably the sum of the currents flowing through tubes 283 and 300 and the current flowing through the heater 173 or 180 is sufficient to heat the parallel connected filaments of the tubes 283 and 300. The anode-cathode current component which is variable in nature, depending on flow in the bore hole adjacent the temperature sensitive elements, is the anode-cathode current of the amplifier. The variations in the total current in the two-conductor circuit attributable to fluid flow are accurately measured. Hence, the necessity of a plurality of circuits from the source 271 into the bore hole is eliminated and a cable of two conductors only is necessary.

For most convenient operation of the instrument, the following considerations may be given to the amplifier grid circuit for control of the sensitivity of the well fluid surveying instrument. As has been previously stated, the ratio of the resistance values of resistors 175 and 181 establishes the bias voltage on tube 283. If resistors 291 and 293 in the grid circuit of tube 283 are selected in the same ratio as are the thermally sensitive resistors 175 and 181, then no change in bias voltage results from their mere inclusion in the circuit. If now the relative magnitude of resistors 291 and 293 is varied while maintaining the desired ratio, sensitivity control is obtained. For example, should the resistance of resistors 291 and 293 be taken as zero, then maximum thermal sensitivity is achieved. On the other hand, if the resistance of resistors 291 and 293 are taken proportionately large, then the resistance variations in resistors 175 and 181 with temperature are effectively masked to yield a low sensitivity grid circuit. Through this technique, amplifier tube 300 can be adjusted for operations confined to the favorable portion of its plate current characteristic over a wide range of fluid flow rates.

It is to be observed that the resistors 175 and 181 are exposed to well pressures as well as temperatures. Although the change of resistance is small over the range of pressures of interest, the effect is entirely cancelled as is the ambient temperature effect because of the balanced design of the grid circuit with respect to the tube 283. It is therefore emphasized that only the change in resistance due to a temperature differential between resistors 175 and 181 is capable of affecting the normal bias on tube 283.

Referring to Figure 13, for measuring the rate and direction of fluid flow at any location within a well bore 342, the exploring unit 31 is suspended within the well bore and at the desired location by means of cable 30. The cable 30 is wound around drum 343 and passed over pulley 344, and by operation of the drum the unit may be raised or lowered to any location such as horizon 345. By means of slip rings (not shown) on the drum 343, the conductors 34 and 40 are led to the power and measuring unit 250. The cable 30 passes through a lubricator 350 attached to the Christmas tree 351 by flanged joint or coupling 352, and the well is provided with casing 354, tubing 355, and liner 360.

With valve 361 on the Christmas tree closed and the flanged joint 352 open, the cable 30 is passed through the lubricator 350. The end of the cable is then passed through cable entry port 44 of socket assembly 20 and affixed therein by tightening gripping wedge 52 against gripping cone 51, the steel braid 40 being positioned therebetween. Contact point 62 is attached to the conductor 34 and the upper pressure head is screwed into the socket assembly. Conductors 253 and 254 of unit 251 in the instrument case 22 are connected to conductors 73 and 72 respectively and the instrument case 22 is screwed into the upper pressure head. The six conductors 257, 259, 261, 263, 265, and 267 from unit 251 in the instrument case 22 are brought out through port 115 in the lower support 23 and connected respectively to the conductors 133, 134, 135, 136, 137, and 138 in the lower pressure head 24. The conductors leading through the port 115 are countertwisted and the lower pressure head is screwed into the lower support 23. Rods 163 and 164 are bolted onto the lower pressure head, the heaters and the temperature sensitive electrical resistors being mounted thereon and having been subjected to an electrical insulation coating process. Conductors 133, 134, 135, 136, 137, and 138 are connected to conductors 258, 260, 262, 264, and 266, respectively. The casing 159 is fitted over the rods and the sensitive elements, and retainer ring 216 is screwed into place. The well fluid surveying instrument is placed within the lubricator, the flanged joint 352 is closed, and valve 361 is opened. With valve 362 open, the instrument is then positioned at any point in the well by operation of drum 343, the depth of the instrument being indicated by any suitable type of depth indicator associated with the cable or the drum. Production from the well through either or both of valves 363 and 364 may be continued while the instrument is being admitted to, maneuvered within, or removed from the well.

Operations at the surface to measure the rate and direction of flow of the fluid within a well bore include the following steps. The exploring unit 31 is positioned at the desired location and with switch 275 in the right-hand position, and after heater 173 has attained equilibrium temperature, resistor 273 is adjusted until meter 279 reads zero which indicates that the current flowing through heater 173 is the value desired for operation as determined by the voltage of the battery 280. When the current is adjusted, switch 275 momentarily is moved to the left-hand position. Immediately thereafter, switch 275 is returned to the right-hand position, placing heater 180 in circuit with conductor 34.

Assuming the flow of fluid to be upward, heat from heater 180 raises the temperature of the resistor 175, thus decreasing its impedance to unbalance the initially balanced grid circuit of tube 283. The unbalance, amplified, is reflected as a change in the total current supplied by source of direct current 272, which change is readily noted by a corresponding change in the reading of meter 279. For a downward flow of fluid, the temperature of resistor 181 is raised, unbalancing the grid circuit of tube 283 in a sense opposite the effect of upward flow producing an opposite deflection of the meter 279. The direction of flow ascribed to a given meter deflection is, of course, a matter of calibration of the instrument, and additionally, the magnitude of the flow is determined for given fluids upon suitable calibration.

Having thus described my invention, it is to be understood that such description has been given by way of illustration and example and not by way of limitation, reference for the latter purpose being had to the appended claims.

What is claimed is:

1. A system for measuring flow of fluid at a point remote from a measuring location which comprises a source of direct current, a circuit including said source extending from said location to said remote point, heating means in intimate heat transfer relation with said fluid at said remote point, switching means for connecting said heating means to said circuit to elevate the temperature of said fluid at said point upon flow of a first component of current from said source through said heating means, a conductive circuit connected in parallel to said heating means through which flows a second component of current from said source, temperature sensitive means in said conductive circuits spaced from said heating means along the line of fluid flow to vary the impedance of said conductive circuit in dependence upon heat transfer from said heating means to said temperature sensitive means proportional to the rate of fluid flow, a dummy load connected to said switching means having the resistance characteristics of said heating means, means at said measuring location for actuating said switching means to connect said source alternately to said heating means and said dummy whereby said first component of current flow may be maintained constant and said second component varies in dependence upon said heat transfer, and means coupled to said circuit for measuring variations in said second component.

2. A system for measuring flow of fluid in a passage which comprises a source of direct current, a cable circuit including said source extending into said passage, heating means in intimate heat transfer relation with said fluid in said passage, switching means for connecting said heating means to said cable circuit to elevate the temperature of said fluid adjacent said heating means upon flow of a first component of current from said source through said heating means, a conductive circuit connected in parallel to said heating means through which flows a second component of current from said source, temperature sensitive means connected in conductivity controlling relation in said conductive circuit spaced from said heating means along the line of fluid flow to vary the impedance of said conductive circuit in dependence upon heat transfer from said heating means to said temperature sensitive means proportional to the rate of fluid flow, a dummy load connected to said switching means having the resistance characteristics of said heating means, means outside said passage for actuating said switching means to connect said source alternately to said heating means and said dummy whereby said first component of current flow may be maintained constant and said second component varies in dependence upon heat transfer by way of said fluids to said temperature sensitive means, and indicating means connected to said cable circuit for measuring variations in said second component.

3. A system for measuring the flow of fluid in a well bore which comprises a housing supported by cable means for movement along said well bore, a two terminal circuit in said housing including a heater and relay means, a second circuit connected between said two terminals including an implifier having an input grid circuit, a source of direct current, a circuit including said source extending from the surface to said two terminals in said well bore, temperature sensitive means spaced from said heater along the line of fluid flow and connected in said grid circuit for controlling current flow therethrough from said source in dependence upon heat transfer from said heater to said temperature sensitive means, a dummy load connected to said relay means and to one of said terminals having the same resistance characteristics as said heater, switching means at the surface of the earth and in said cable circuit for energizing said relay means to substitute said dummy load in said two terminal circuit for said heater, and means at the surface of the earth and connected to said cable circuit for measuring variations in the sum of the current flowing through said two terminal circuit and the current flowing through said amplifier.

4. A system for measuring flow of fluid in a well bore comprising a housing, said housing being cable supported for movement along said well bore, an amplifier positioned in said housing having a control grid, an anode terminal and a cathode terminal, a source of direct current, a two conductor circuit including said source and extending from the surface of the earth into said well bore and connected to said anode and cathode terminals, a heater in intimate heat transfer relation with fluids in said well bore connected to one of said terminals, a dummy load connected to said last named terminal, two temperature sensitive resistance elements spaced from and positioned on opposite sides of said heater spaced therefrom along the line of fluid flow and connected between said grid and said cathode terminal for controlling the anode-cathode impedance of said amplifier in dependence upon heat transfer from said heater to said temperature sensitive elements, switching means for connecting said heater and said dummy load alternately to the second of said terminals for flow of current therethrough, and means at the surface of the earth and in said cable circuit for measuring variations in the total current in said two conductor circuit upon substitution of said dummy load for said heater.

5. A system for measuring fluid flow in a well bore which comprises an exploring unit including a housing supported by cable means for movement along said well bore, at least one vacuum tube in said housing having an anode, a control grid, a cathode, and a filament, a source of direct current, a two conductor circuit including said source extending from the surface of the earth to said exploring unit and connected to said anode and to one terminal of said filament, two temperature sensitive resistance elements and biasing means series connected between said control grid and a common connection between said cathode and the other terminal of said filament with said resistive elements positioned in spaced-apart relation along the length of said housing, a fluid heater connected to said cathode and positioned intermediate said temperature sensitive elements, a dummy load connected to said cathode having the same resistance characteristics as said heater, a switch connected to said anode, means in said two conductor circuit at the surface of the earth for actuating said switch selectively to connect said heater or said dummy load to said source to control the anode-cathode current of said tube in dependence upon heat transfer from said heater to said temperature sensitive elements, and means for measuring the sum of the said anode-cathode current and the current flowing through said heater or said dummy load.

6. A system for measuring flow of fluid in a well bore comprising a housing supported by cable means for movement along said well bore, an amplifier positioned in said housing having a control grid, an anode terminal and a cathode terminal, a source of direct current, a two conductor circuit including said source and conductors in said cable means connected to said anode and cathode terminals, a heater in intimate heat transfer relation with fluids in said well bore connected to one of said terminals, a dummy load connected to said last named terminal, two temperature sensitive resistance elements positioned adjacent said heater spaced on opposite sides thereof along the line of fluid flow and connected between said grid and said cathode terminal for controlling the anode-cathode impedance of said amplifier in dependence upon heat transfer from said heater to said temperature sensitive elements, a first relay having a coil and an armature normally biased to a first of two circuit completing positions, a circuit from said anode terminal through the coil of said first relay to said armature, a ratchet relay having an armature for contacting two circuit completing positions, a circuit from the normally closed position of said first relay through the coil of said ratchet relay to said cathode terminal, circuit means respectively connected between one terminal of said heater and one terminal of said dummy load and two circuit completing positions of said ratchet relay, means at the surface of the earth for opening and closing said two conductor circuit for repeated application of the voltage of said source to said cable sequentially to move said stepping relay between said two circuit completing positions and simultaneously to substitute for said stepping relay said heater or said dummy load thereby to produce a variation in the component of the current flowing through said amplifier in dependence upon transfer of heat from said heater to said temperature sensitive elements, and means for measuring variations in the total current in said two conductor circuit.

7. A system for measuring the flow of fluid in a well bore which comprises a housing supported by cable means for movement along said well bore, a source of current, a two conductor circuit including said source and conductors in said cable means extending from the surface of the earth into said well bore, a fluid heater positioned in said housing in intimate heat transfer relation to fluids therein and connected at one terminal to a first conductor of said two conductor circuit, a dummy load having the resistance characteristics of said heater connected at one terminal to said first conductor, a stepping switch having two circuit completing positions connected respectively to the second terminal of said heater and said dummy load, means for actuating said stepping switch alternately to connect the second of said conductors to said two circuit completing positions, an amplifier including at least one vacuum tube having an anode terminal, a control grid and a cathode terminal connected at said anode and cathode terminals to the conductors of said two conductor circuit for flow of direct current therethrough from said source, temperature sensitive resistance elements positioned in heat transfer relation to said fluid closely adjacent said heater on opposite sides thereof along the line of fluid flow and connected between said grid and said cathode terminal for varying the resistance characteristic of said amplifier in dependence upon heat transfer between said heater and said resistance element, means at the surface of the earth for selectively opening and closing said two conductor circuit for actuating said stepping switch, and means at the surface of the earth for measuring variations in the total current in said circuit for successive closure thereof.

8. A system for measuring flow of fluid in a well bore comprising a source of direct current, cable means including a two conductor circuit extending from said source into said well bore, a housing supported by said cable means for movement along said well bore, two heaters supported by said housing and connected to one of the conductors of said circuit at least one of which is in intimate heat transfer relation to the fluids in said well bore, switching means in said well bore for selectively connecting one or the other of said heaters to the second of said conductors, a sensing circuit connected across said two conductors in said well bore and having controlling means including temperature sensitive elements on opposite sides and adjacent the heater in intimate heat transfer relation to said fluids and in the path of fluid flow past said last named heater for controlling current flow in said sensing circuit, means at the surface of the earth for selectively opening and closing said two conductor circuit for repeated current flow through said sensing circuit and alternate current flow through one or the other of said heaters, and means at said source for measuring variations in the current in said two conductor circuit for successive closures thereof.

9. A system for measuring flow of fluid in a well bore which comprises a source of direct current, cable means including two conductors connected to said source and extending from the surface of the earth into said well bore, a housing supported by said cable means for movement along said well bore, a plurality of fluid heaters of identical resistance characteristics supported by said housing and at least one of which is in intimate heat transfer relation with the fluids in said well bore and all of which have one terminal thereof connected to one of said conductors, switching means for completing in sequence a conductive circuit through said heating means to the other of said conductors for current flow from said source, a second circuit connected between said two conductors for modifying current flow therein, temperature sensitive resistance means connected in signal controlling relation to said circuit and positioned adjacent but spaced from said one of said heaters in the path of fluid flow therefrom for producing a current controlling change in said second circuit in dependence upon heat transfer from said one of said heaters to said resistance means, means for repeatedly actuating said switching means for energizing said heaters in said sequence, and means coupled to the circuit formed by said two conductors for detecting said modifications in current flow during said sequence.

10. A system for measuring flow of fluid in a well bore which comprises a source of direct current, cable means including two conductors connected to said source and extending from the surface of the earth into said well bore, a housing supported by said cable means for movement along said well bore, a plurality of fluid heaters of identical resistance characteristics supported by said housing at least one of which is in intimate heat transfer relation with the fluids in said well bore and all of which have one terminal thereof connected to one of said conductors, switching means for completing in sequence a conductive circuit through each of said heaters to the other of said conductors for flow of a first component of current from said source whereby said component may be maintained constant throughout said sequence, a direct current amplifier in said housing connected between said conductors through which flows a second component of current from said source, temperature sensitive resistance means connected in resistance controlling relation in said amplifier circuit and spaced from said one of said fluid heaters and in the path of fluid flow therefrom to control the magnitude of said second component of current in dependence upon heat transfer from said one of said heaters, means at the surface of the earth and connected to said two conductor circuit for repeatedly actuating said switching means for energizing said heaters in said sequence, and means for measuring variations in said second component during said sequence.

References Cited in the file of this patent

UNITED STATES PATENTS

| Number | Name | Date |
|---|---|---|
| 1,265,775 | Hadaway, Jr. | May 14, 1918 |
| 2,319,516 | Phelps | May 18, 1943 |
| 2,359,334 | Smith | Oct. 3, 1944 |
| 2,377,884 | Hillman | June 12, 1945 |
| 2,458,331 | Borell | Jan. 4, 1949 |
| 2,524,150 | Vincent | Oct. 3, 1950 |